US011880006B2

(12) United States Patent
Misulia et al.

(10) Patent No.: US 11,880,006 B2
(45) Date of Patent: Jan. 23, 2024

(54) LINE ARRAY WINDING AND DEPLOYMENT SYSTEM

(71) Applicant: Raytheon Company, Waltham, MA (US)

(72) Inventors: Joseph Misulia, Attleboro, MA (US); Curtis B. Carlsten, Portsmouth, RI (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 18/059,669

(22) Filed: Nov. 29, 2022

(65) Prior Publication Data

US 2023/0168402 A1    Jun. 1, 2023

Related U.S. Application Data

(60) Provisional application No. 63/284,296, filed on Nov. 30, 2021.

(51) Int. Cl.
*G01V 1/20* (2006.01)
*G01V 1/18* (2006.01)

(52) U.S. Cl.
CPC .............. *G01V 1/202* (2013.01); *G01V 1/186* (2013.01)

(58) Field of Classification Search
CPC .......... G01V 1/202; G01V 1/186; G01V 1/38; G01V 1/3843; G01V 1/3852; G01V 1/201; B65H 75/4471; B65H 75/4473; H02G 1/10; G10K 11/008
See application file for complete search history.

(56) References Cited

U.S. PATENT DOCUMENTS

| 6,988,854 B2 | 1/2006 | Porter |
| 7,036,601 B2 * | 5/2006 | Berg ..................... G02B 6/4457 |
| | | 242/402 |

(Continued)

FOREIGN PATENT DOCUMENTS

| AU | 2021242171 A1 * | 9/2022 | ............. G01V 1/186 |
| CA | 3172995 A1 * | 9/2021 | ............. G01V 1/186 |

(Continued)

OTHER PUBLICATIONS

International Search Report and Written Opinion dated Mar. 13, 2023 in corresponding International Application No. PCT/US2022/080570.

*Primary Examiner* — Daniel Pihulic
(74) *Attorney, Agent, or Firm* — Renner, Otto, Boisselle & Sklar LLP

(57) ABSTRACT

A packed sensor line array system includes sensors mounted outboard of cable packs wrapped around a central mandrel. The system may have multiple rows (layers) of the sensors and cable packs, surrounded by a cannister. Cable retainers may be used to retain cable ends near sensors, to keep the cable ends out of the way of subsequent winding operations. The winding may be done in situ, with the mandrel mounted to a rotatable chuck that is rotated to wind the individual cable packs sequentially around the mandrel, with positioning of the sensors outboard of the windings occurring between the winding operations. A positionable indexing tool may be coupled to and moved along the mandrel, to define a space along the mandrel for each cable pack winding.

20 Claims, 4 Drawing Sheets

(56) References Cited

U.S. PATENT DOCUMENTS

| | | | |
|---|---|---|---|
| 7,510,349 B2* | 3/2009 | Berg | H02G 1/10 |
| | | | 405/166 |
| 10,375,939 B2 | 8/2019 | Partan et al. | |
| 11,682,373 B2* | 6/2023 | Misulia | G10K 11/006 |
| | | | 367/149 |
| 2004/0065443 A1* | 4/2004 | Berg | E21B 47/01 |
| | | | 166/380 |
| 2005/0082409 A1 | 4/2005 | Jundt et al. | |
| 2007/0248417 A1* | 10/2007 | Berg | G01V 1/38 |
| | | | 405/158 |
| 2010/0074048 A1* | 3/2010 | Furuhaug | G01V 1/3843 |
| | | | 206/408 |
| 2016/0257525 A1 | 9/2016 | Hawkes et al. | |
| 2016/0327640 A1 | 11/2016 | Seite et al. | |
| 2021/0302605 A1* | 9/2021 | Misulia | G10K 11/006 |
| 2023/0168402 A1* | 6/2023 | Misulia | G10K 11/008 |
| | | | 367/15 |

FOREIGN PATENT DOCUMENTS

| | | | | |
|---|---|---|---|---|
| CN | 110712719 A | 1/2020 | | |
| EP | 0205740 B1 | 1/1992 | | |
| GB | 1525422 A | 9/1978 | | |
| WO | WO-2021194614 A1 * | 9/2021 | | G01V 1/186 |

* cited by examiner

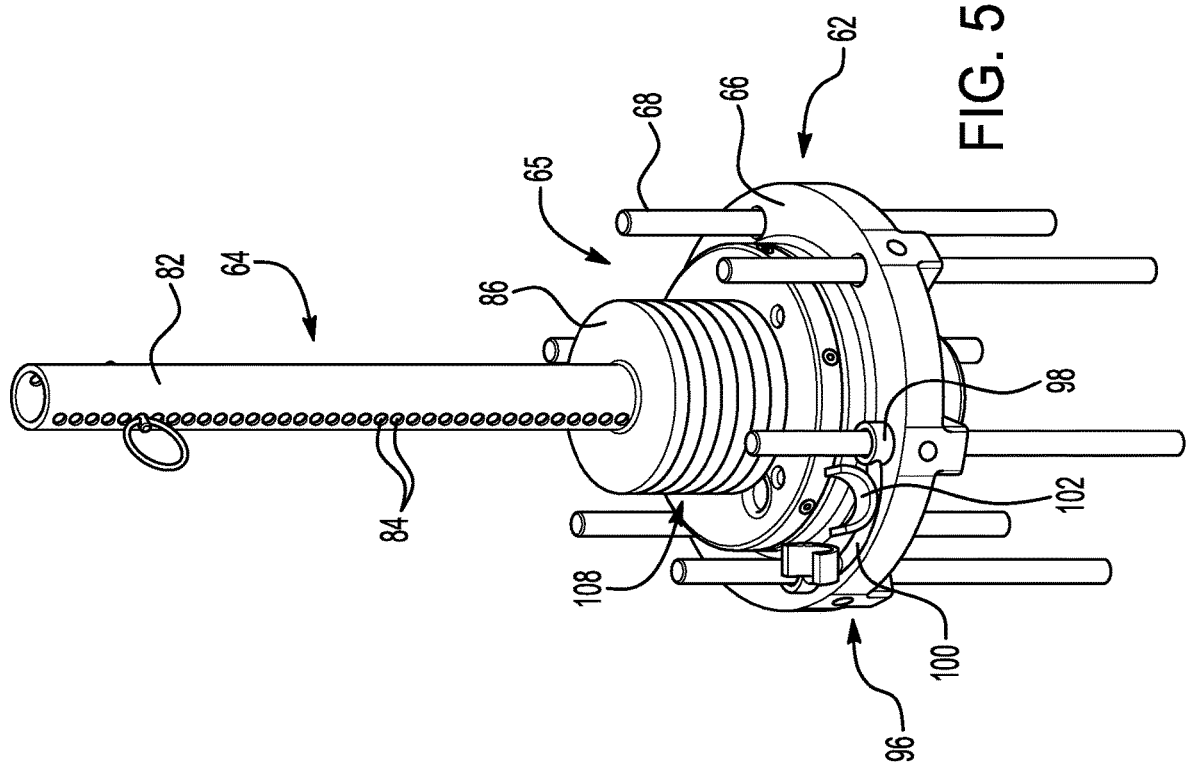
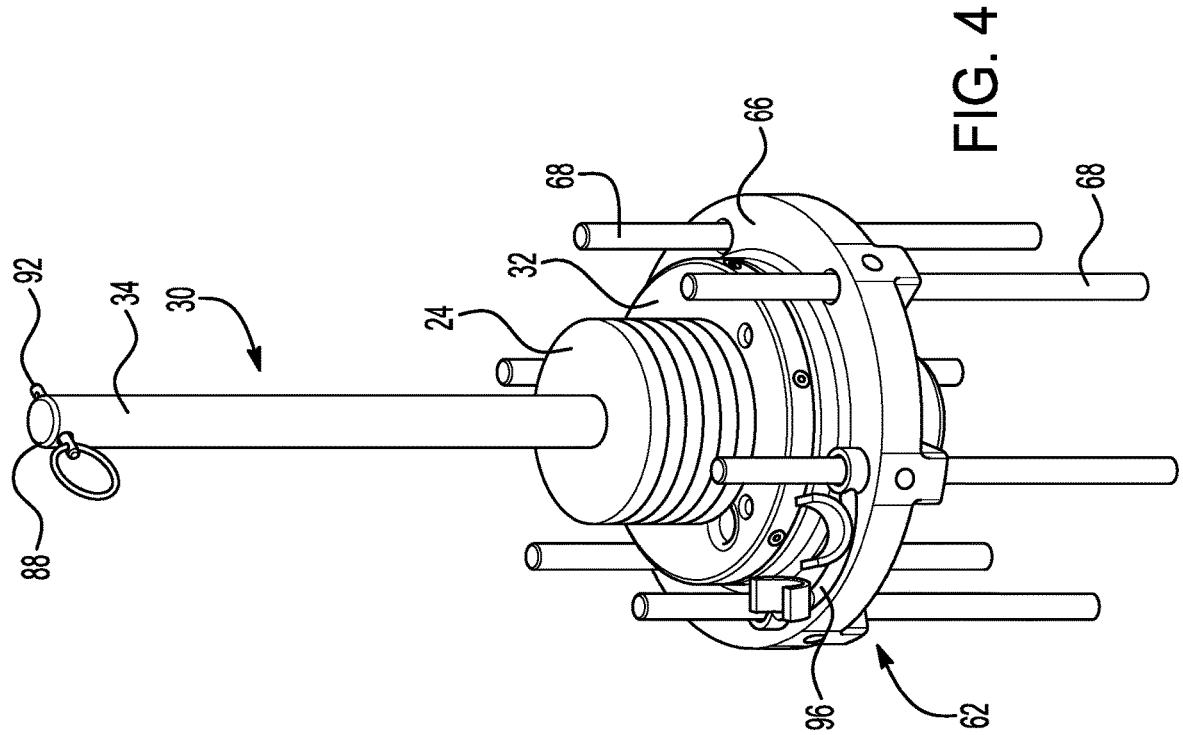

LINE ARRAY WINDING AND DEPLOYMENT SYSTEM

RELATED APPLICATION

This application claims priority from U.S. Provisional Application 63/284,296, filed Nov. 30, 2021, the entire disclosure of which is incorporated herein by reference.

FIELD

The application is in the field of sensor line arrays, and methods for packing and deploying such arrays.

BACKGROUND

Hydrophone line arrays intended for sonobuoy use are difficult to pack into small form factors because the hydrophone outer diameter (OD) is often ~10× the OD of the associated array cable. Traditional cable packing and winding methods cannot be used; they cannot accommodate both the small diameter cable as well as the associated large diameter hydrophone in an efficient manner.

SUMMARY

According to an aspect of the disclosure, a system is used for packing and deploying sensor line arrays in a very small form factor (such as an A-size sonobuoy). The system also allows for a dependable array deployment without damaging or stressing the often-fragile array sensors and associated array cable.

According to another aspect, a system is an array packing scheme that has sensors arranged around individual cable packs that are wound in-situ using a set of array packing tools described herein.

The system can easily be modified to accommodate arrays of different geometries, different sensor spacing, and different numbers of sensors per array.

The invention is configured to allow for autonomous release at depth via burnwire release or other similar release mechanism.

According to another aspect, a packed sensor line array system includes: a central mandrel; and sensors connected by cable packs that are between successive of the sensors, the sensors and the cable packs together constituting a sensor line array; wherein the cable packs are wound around the central mandrel; and wherein the sensors are outboard of the cable packs.

According to an embodiment of any paragraph(s) of the summary, the cable packs are stacked in an axial direction when wound around the central mandrel.

According to an embodiment of any paragraph(s) of the summary, the packed array includes one or more cable retainers for retaining ends of the cable packs that are closest to the sensors.

According to an embodiment of any paragraph(s) of the summary, the one or more cable retainers are one or more rings that to which the ends of the cable are coupled.

According to an embodiment of any paragraph(s) of the summary, the mandrel is part of a pedestal that also includes a terminal weight at an end of the mandrel.

According to an embodiment of any paragraph(s) of the summary, the sensors are arranged to facilitate deployment from sonobuoys.

According to an embodiment of any paragraph(s) of the summary, the packed array is in combination with equipment for winding the cable packs around the mandrel.

According to an embodiment of any paragraph(s) of the summary, the equipment includes an indexing tool.

According to an embodiment of any paragraph(s) of the summary, the indexing tool includes an annular disk, and a hollow rod attached to the plate.

According to an embodiment of any paragraph(s) of the summary, the hollow rod is configured to fit around the central mandrel, and to be secured to the central mandrel in any of multiple positions.

According to an embodiment of any paragraph(s) of the summary, the hollow rod has multiple holes therein, separated axially along the rod.

According to an embodiment of any paragraph(s) of the summary, the central mandrel has a hole therein.

According to an embodiment of any paragraph(s) of the summary, the hollow rod is maintained in position relative to the central mandrel, by alignment of one of the multiple holes of the hollow rod with the hole of the central mandrel.

According to an embodiment of any paragraph(s) of the summary, the equipment includes a winding fixture.

According to an embodiment of any paragraph(s) of the summary, the winding fixture includes a plate, and a series of adjustable rods coupled to the plate.

According to an embodiment of any paragraph(s) of the summary, the winding fixture is configured to couple the central mandrel to a rotatable chuck.

According to an embodiment of any paragraph(s) of the summary, the equipment includes one or more retainer clips.

According to an embodiment of any paragraph(s) of the summary, the sensor retainer clips are configured to secure sensors around the wound cable packs during winding.

According to another aspect, a method of loading a sensor line array of alternating cable packs and sensors for a packed sensor line array system, the method including: iteratively, for each of the cable packs in succession, winding the cable pack around a central mandrel, and placing the sensor next to the cable pack outboard of the wound cable pack.

According to an embodiment of any paragraph(s) of the summary, the method further including, between successive iterations of windings of the cable packs, adjusting an indexing tool to provide a winding space on the central mandrel for winding of a subsequence cable pack.

According to an embodiment of any paragraph(s) of the summary, the method further including coupling, to one or more retainer rings of the packed sensor line array system, ends of the cable pack adjoining the sensors.

According to an embodiment of any paragraph(s) of the summary, the method further including coupling, to one or more sensor clips outboard of the wound cable packs, sensors of sensor line array.

According to an embodiment of any paragraph(s) of the summary, the winding is accomplished by rotating the packed sensor line array system using a rotating chuck to which the packed sensor line array system is coupled.

According to yet another aspect, a system for packing and deploying sensor line arrays includes: sensors; and cable packs; wherein the sensors are arrayed around the cable packs.

According to an embodiment of any paragraph(s) of the summary, the sensors correspond to respective of the cable packs.

According to an embodiment of any paragraph(s) of the summary, the system includes one or more sensor retainer clips.

According to an embodiment of any paragraph(s) of the summary, the one or more sensor retainer clips retain the sensors in the array during assembly.

According to an embodiment of any paragraph(s) of the summary, the system further includes one or more cable retainers that secure ends of the cable packs.

According to an embodiment of any paragraph(s) of the summary, the one or more cable retainers include one or more cable retainer rings.

According to an embodiment of any paragraph(s) of the summary, the one or more rings are made of compliant plastic or rubber.

According to an embodiment of any paragraph(s) of the summary, cables are pressed into displacement type clips of the one or more rings.

According to an embodiment of any paragraph(s) of the summary, the ring has features that allow an O-ring to be installed over cable, retaining cable towards clip.

According to an embodiment of any paragraph(s) of the summary, the ring is smooth.

According to an embodiment of any paragraph(s) of the summary, cables are adhesively connected to the ring.

According to an embodiment of any paragraph(s) of the summary, an upper portion of cable for each sensor is installed to a retainer clip that lightly holds the sensor upright, and towards the exterior shell as the inner cable packs payout upward.

According to an embodiment of any paragraph(s) of the summary, the system further includes a binder material that holds shape of the pack.

According to an embodiment of any paragraph(s) of the summary, the system further includes an outer shell or cannister.

According to still another aspect, an installation tool for a system of any other claim(s), the tool including a pedestal and an indexing tool mechanically coupled to the pedestal.

According to an embodiment of any paragraph(s) of the summary, the tool is installed to a rotating chuck for assembling the system of any paragraph(s) of the summary.

According to a further aspect, a method of using the tool of any other paragraph(s) of the summary is used to assemble the system of any other paragraph(s) of the summary.

According to an embodiment of any paragraph(s) of the summary, the method further includes extending the indexing tool relative to the pedestal to form individual cable packs.

According to an embodiment of any paragraph(s) of the summary, the method further includes extending vertical bars.

According to an embodiment of any paragraph(s) of the summary, the method further includes installing the outer shell or cannister.

According to an embodiment of any paragraph(s) of the summary, the method further includes using sensor clips to hold the sensors in place during pack winding.

To the accomplishment of the foregoing and related ends, the disclosure comprises the features hereinafter fully described and particularly pointed out in the claims. The following description and the annexed drawings set forth in detail certain illustrative embodiments of the invention. These embodiments are indicative, however, of but a few of the various ways in which the principles of the disclosure may be employed. Other objects, advantages and novel features will become apparent from the following detailed description of the disclosure when considered in conjunction with the drawings.

BRIEF DESCRIPTION OF DRAWINGS

The annexed drawings, which are not necessarily to scale, show various aspects of the disclosure.

FIG. 4 is an oblique view of a partially-packed system, with some parts removed for illustration purposes.

FIG. 5 is an oblique view of the partially-packed system of FIG. 4, in combination with an indexing tool.

DETAILED DESCRIPTION

Figure 1:
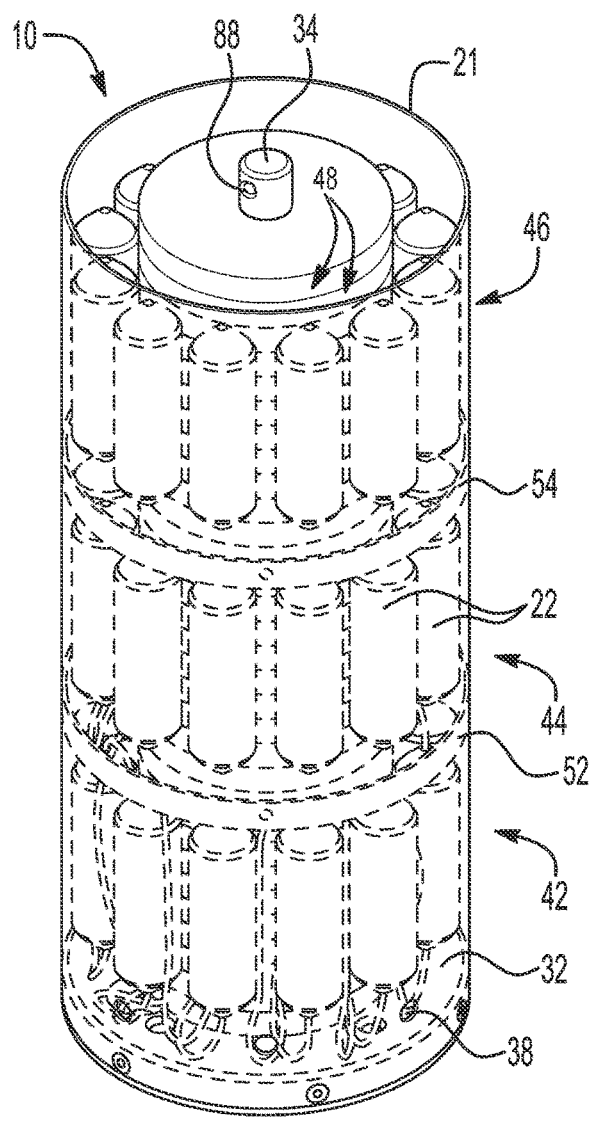
FIG. 1 is an oblique view of a packed sensor line array system, according to an embodiment.

A packed sensor line array system includes sensors mounted outboard of cable packs wrapped around a central mandrel. The system may have multiple rows (layers) of the sensors and cable packs, surrounded by a cannister. Cable retainers may be used to retain cable ends near sensors, to keep the cable ends out of the way of subsequent winding operations. The winding may be done in situ, with the mandrel mounted to a rotatable chuck that is rotated to wind the individual cable packs sequentially around the mandrel, with positioning of the sensors outboard of the windings occurring between the winding operations. A positionable indexing tool may be coupled to and moved along the mandrel, to define a space along the mandrel for each cable pack winding.

A system for packing and deploying sensor line arrays is described herein. Arrays are assembled onto central mandrel/pedestal using winding fixtures. Array is assembled on first-in, last-out basis. The sensor installed first, pays out last. Cable between sensors (for example, 6 meters (20 feet)) is wound around central mandrel as sensors are installed in system creating individual cable packs. In an embodiment an array having 36 sensors shown, but the system can be modified to accommodate any number of sensors.

The 36 individual cable packs are wound in-situ using packing tools/fixtures. Deployment is reverse of packing process, first in last out. Cable binder may be used for packs to keep shape. Sensor cable retainer clips keep the sensors in place as other sensors pay out. The exterior cannister may be a 20-gauge Al, deep-drawn sheet metal exterior tube. The tube (cannister) may be installed last.

The sensors assembled around the cable packs, held in place by a tool during packing, and retainer clips (not shown) prior to deployment. 100 deg flat heads attach exterior to term weight/pedestal structure. The array is retained around central cable packs during deployment by sensor cable retention clips. The upper portion of cable for each sensor is installed to retainer clip that lightly holds the sensor upright, and towards the exterior shell as the inner cable packs and associated sensors payout upward.

Sensor cable retainer clip may be of any of a variety of concepts. All concepts are fastened to exterior shell with 100 deg flatheads. Each concept retains cable differently: 1) ring made of compliant plastic or rubber and cables are pressed into displacement type clip features; 2) ring has features that allow a small o-ring to be installed over cable, retaining cable towards clip; and 3) ring is simple/smooth, cable is "glued" to ring using temporary adhesive (low tack hot melt glue, "booger" glue, etc.).

The array pack is assembled bottom to top (first sensor in is S36, S1 last in). Tool is installed to rotating chuck, cable is wound around the pedestal. An indexing tool sets size of individual packs. Packs hold shape due to binder material that is applied as cable is wound. During packing, sensors are folded down onto vertical bars and sensor clips so that the subsequent sensors and cable can be wound. Sensor leads are left long enough to allow the sensor to fold over. As the pack builds, vertical bars are extended and additional sensor clips are added.

After the first 12 sensors are wound, they are installed to sensor cable clip and held in place around cable packs by VELCRO (a hook-and-loop material). Vertical bars are extended to enable packing of S13-S24. Similar operation for S25-S36 is executed. After all sensors are packed, the VELCRO straps are removed and an outside diameter (OD) shell is installed over pack and installed to term weight/pedestal and sensor cable clips.

The systems described herein offer advantages/distinctions over prior approaches/No known solution exists for packing hydrophone arrays of this geometry, or other systems of this geometry, into such small form factors that can be deployed reliably with no damage to array. The proposed system affords a high degree of flexibility. It can efficiently pack and deploy arrays having cables and sensor of significantly different diameters and shapes. Binder material and application allow cable packs to retain their shape until deployment. The disclosed systems also allow for variations in spacing within the array itself.

An array with varied spacing can be accommodated by designing packing tool such that individual cable packs of different heights are formed. The system can quickly and easily be re-configured to match a given application. The system offers a high degree of deployment reliability. The first-in/last-out packing method ensures the cable is never installed in a condition that will lead to tangling or knotting.

The disposed system is wound under light tension; cable packs are sized to allow for some volume inefficiencies such that low cable tension is needed, keeping stress on fragile cable down.

Figure 2:
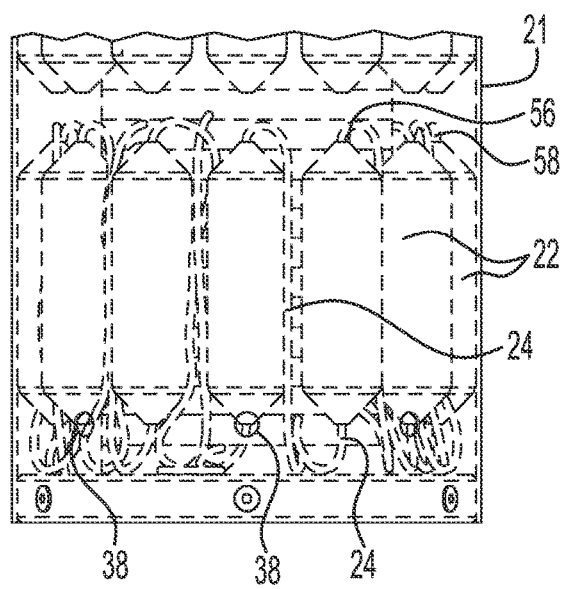
FIG. 2 is a magnified side view of part of the system of FIG. 1.
Figure 3:
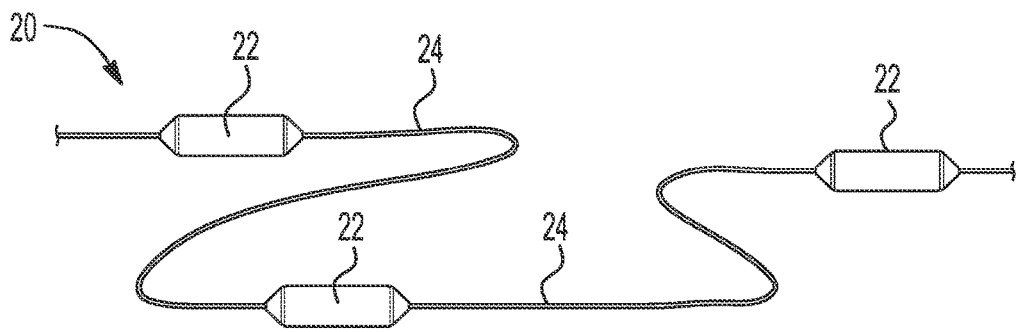
FIG. 3 is a view of part of a sensor line array, prior to packing.

FIGS. 1 and 2 show a packed sensor line array system 10 that includes a sensor line array 20 packed within a cannister 21. FIG. 3 shows the general layout of the sensor line array 20, with a series of sensors 22 connected by cable packs (lengths of cable) 24 therebetween. All of the sensors 22 of the sensor line array 20 may be strung together by intervening cables 24, so that when deployed the sensor line array 20 constitutes a single long line of sensors, spaced apart by intervening lengths of cable.

The sensors 22 may be hydrophones, for example. In an embodiment the sensors 22 may each have an overall length of 7 cm (2.75 in) and a diameter of 2 cm (0.78 in), although a wide variety of other sensor sizes are possible.

The cables packs 24 may have considerable length. In an embodiment the cable packs 24 are 2 mm (0.075 inch) thick cable, and the length of cable between adjacent of the sensors 22 is 6 meters (20 feet). Many other suitable dimensions for the cables are possible, making for (for example) any of a variety of suitable spacings of the sensors 22 when the sensor line array 20 is deployed.

Returning to FIGS. 1 and 2, and referring in addition to FIGS. 4 and 5, the system 10 includes within the cannister 21 a pedestal 30 that includes a terminal weight 32 and a mandrel 34. The sensor line array 20 is installed within the cannister 21, with the cable packs 24 wrapped about the mandrel 34, and with the sensors 22 array along the perimeter of the system 10, along the inner wall of the cannister 21 and outboard of the cable packs 24. The cannister 21 may have flood holes 38 in its lower portion, to aid in letting water into the interior of the cannister 21 as the system is dropped into water as part of the process for deploying the sensor line array 20.

For the single sensor line array 20, the sensor line 20 is loaded from one end to the opposite end, the sensors 22 being successively held in place while the adjoining cable packs 24 are successively wound about the mandrel 34. The sensors 22 (and accompanying cable packs 24) are loaded in the order that the sensors 22 will be deployed from the cannister 21, with the last sensor loaded being the first deployed. The sensor line 20 is loaded from the bottom of the cannister 21, with a bottom row (layer) 42 loaded before a middle row (layer) 44, which is loaded before a top row (layer) 46. The cable packs 24 are wound about the mandrel 34 in successive axial layers 48, beginning with the bottom of each of the rows 42-46.

The rows 42, 44, and 46 have corresponding retainer rings 52 and 54 between them. The retainer rings 52 and 54 may each have cable retainer clips for securing ends, such as cable pack ends 56 and 58 (FIG. 2), that are near the sensors 22, during and after loading of the sensor line array 20 into the system 10.

The system 10 is configured to allow winding of the sensor line array 10 around the mandrel 34 with the mandrel 34 in place. A winding fixture 62 and an array pack indexing tool 64 are equipment 65 used in the winding process. The equipment also includes sensor clips, discussed further below.

A plate 66 of the fixture 62 is coupled to the pedestal 30, such as by being bolted to the terminal weight 32. A series of adjustable rods 68 are located circumferentially around the plate 66, outboard of the locations in the system 10 for the cable packs 24, the sensors 22, and the retainer rings 52 and 54. The rods 68 may be used to secure the winding fixture 62 during the winding process. The rods 68 may have their positions adjusted during the winding process, as the sensor line 20 is wound to produce the system 10, from the bottom row 42 (FIG. 1) upwards. Set screws may be used to fix the rods 68 in a desired position.

The tool 64 is used during the loading (assembly, or winding) process, to direct the wound cable packs 24 in a series of axial layers, atop one another, as successive of the cable packs 24 are wound around the mandrel 34. The indexing tool 64 has a hollow rod 82 that has a series of holes 84, and an annular disk 86 at a bottom end of the hollow rod 82. The holes 84 may be evenly spaced in an axial direction of the hollow rod 82, with the spacing corresponding to a desired height for the winding of a single of the cable packs 24 around the mandrel 34. The holes 84 may be through holes, passing through both of the walls of the hollow rod 82 along diameters of the rod 82, at different heights along the rod 82. The mandrel 34 has a single hole 88 near its top. A pin 92 may be used to pass through one of the holes 84, and through the hole 88, to secure the indexing tool 64 (and specifically the annular disk 86) at a desired height along the mandrel 34.

One or more sensor clips, such as a sensor clip 96, may be used to hold adjacent of the sensors 22 in place as the cable packs 24 are sequentially wound around the mandrel 34. The sensor clip 96 may have collars 98 that fit over an adjacent pair of the adjustable rods 68, a curved bar 100 between the collars 98, and sensor-receiving members 102 for gripping a pair of the sensors 22. Multiple sensor clips 96 may be used at the same time, for example to hold all of the sensors of a row (layer) during assembly of that row (layer) of the system 10.

In loading the sensor line 20 to assemble the system 10, the indexing tool 64 is positioned to provide a suitable space for the winding of a single cable pack 24 around the mandrel 34, with for example the indexing tool 64 positioned with in the pin 92 in the next lower hole 84 along the hollow rod 82 than was used for a previous winding. This allows each of the wound cable packs 24 to have their own respective winding spaces 108. The spaces 108 for successive wound cable packs 24 are axially stacked from bottom to the top of the system 10, which prevents the windings from different of the cable packs 24 from overlapping. This facilitates smooth unspooling of the cable packs 24 as the sensor line 20 is deployed from the system 10.

Figure 6:
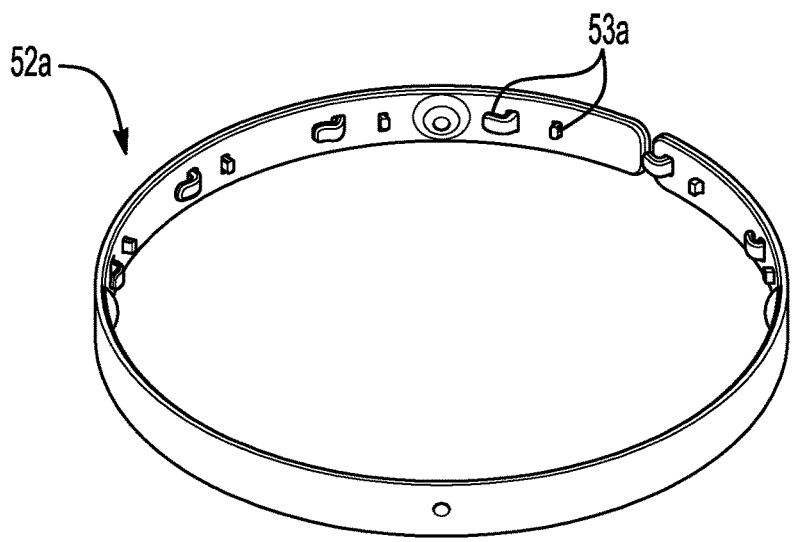
FIG. 6 is an oblique view of a first embodiment retainer ring usable as part of a packed sensor line array system.
Figure 7:
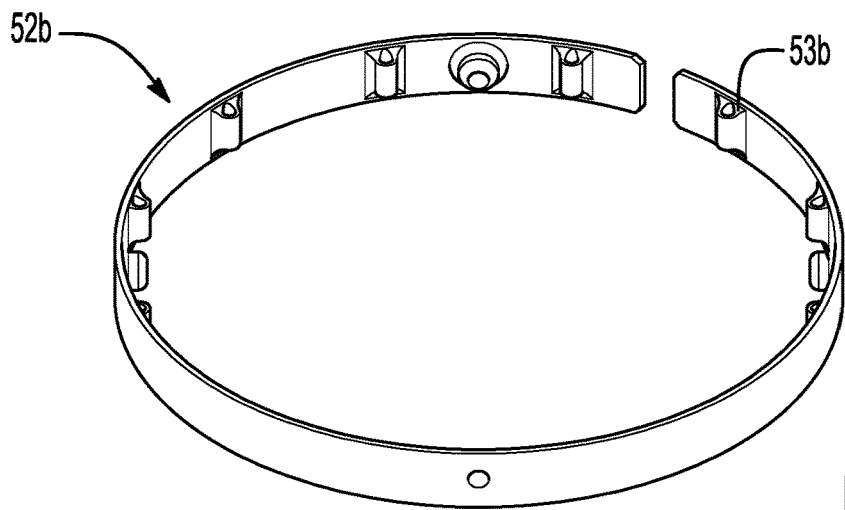
FIG. 7 is an oblique view of a second embodiment retainer ring usable as part of a packed sensor line array system.
Figure 8:
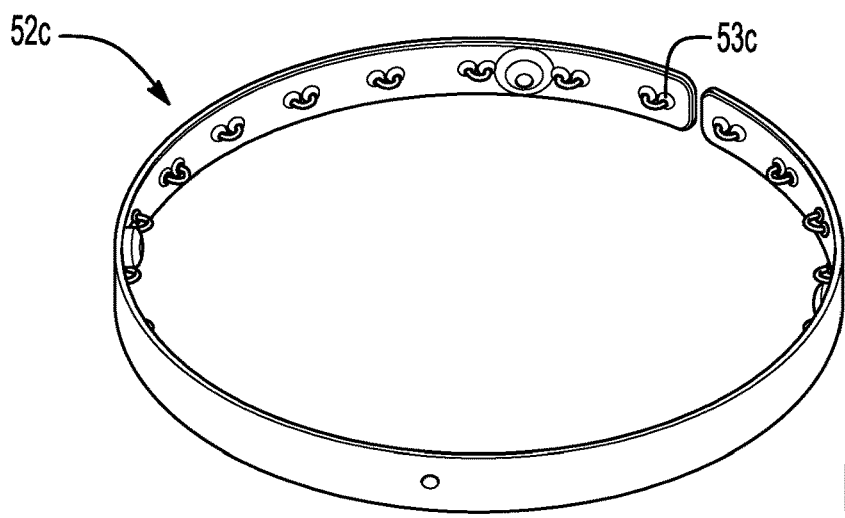
FIG. 8 is an oblique view of a third embodiment retainer ring usable as part of a packed sensor line array system.

FIGS. 6-8 show three possible configurations for the retainer rings 52 and 54. In all of the configurations the retainer rings have cable clips for retaining portions of the cable packs 24, for example lengths of cable near the ends of the sensors 22. In a first configuration, shown in FIG. 6, a retainer ring 52a has hooks or displacement features 53a for retaining cable portions. In a second configuration, shown in FIG. 7, a retainer ring 52b has clips 53b that include recesses or detents that receive and secure cable portions, such as with small O-rings installed over the cable portion. In a third configuration, shown in FIG. 8, a retainer ring 52c has clips 53c having arms that secure portions of cable, and/or allow the cable to be secured (glued) to the ring using an adhesive, such as a temporary adhesive, for example a low-tack hot-melt glue.

The various parts of the system 10 may be made of suitable materials, and may be constructed by suitable processes. For example the pedestal 30 and/or the indexing tool 64 may be made of a suitable metal, such as aluminum or stainless steel. The cannister 21 also may be made of aluminum. The retainer rings 52 and 54 may be made a compliant material, such as compliant plastic or rubber. The sensor clips 96 may be additively manufactured, such as out of plastic.

Figure 9:
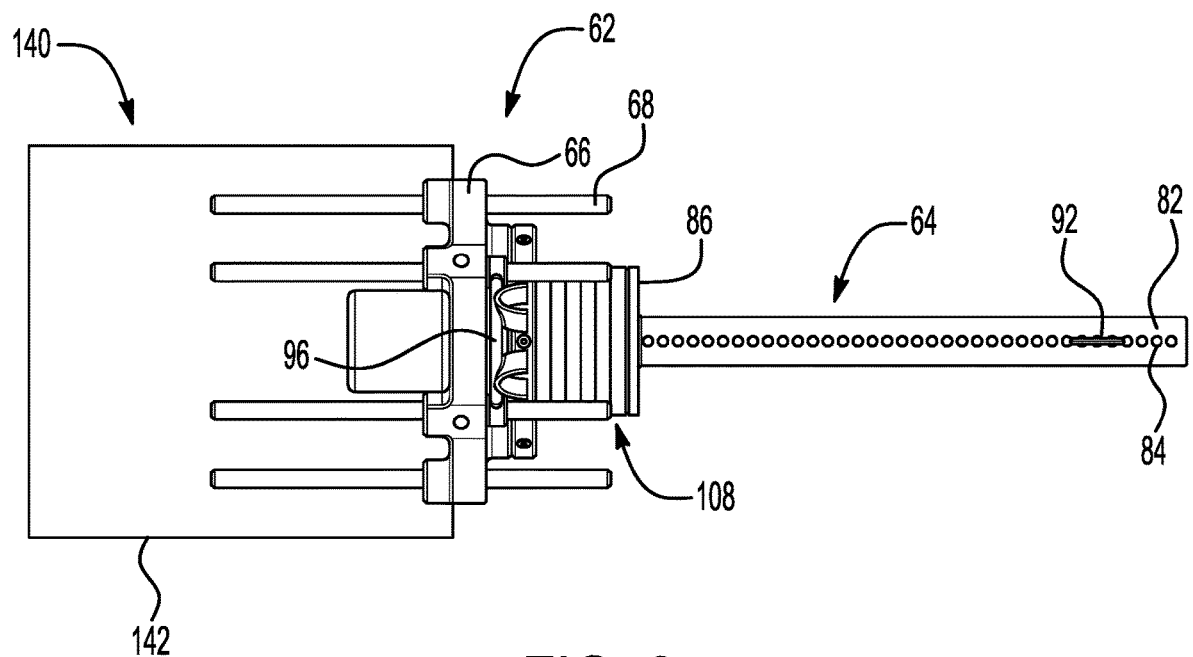
FIG. 9 is a side view illustrating a method of packing the system of FIG. 1.
Figure 10:
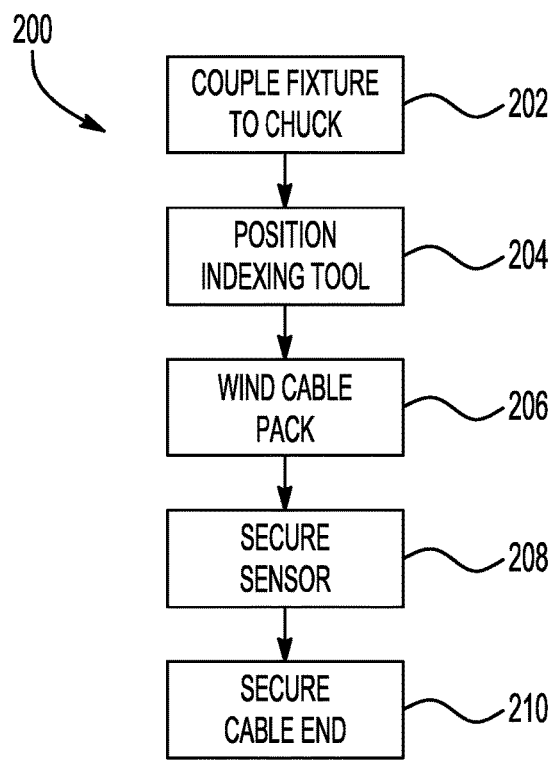
FIG. 10 is a high-level flow chart of the method of packing the system.

FIG. 9 shows parts of a packing system 140 for installing the sensor line array 20 (FIG. 3) as part of the packed sensor line array system 10 (FIG. 1). FIG. 10 is a high-level flow chart of a method 200 of installing the sensor line array 20. In step 202 the fixture 62 is coupled to a rotating chuck 142 of the system 140. In step 204 the indexing tool 64 is secured to the mandrel 34 at the location to leave the next winding space 108 free.

Then in step 206 the next cable pack 24 (FIG. 3) is wound around the mandrel 34 (FIG. 4) by rotating the chuck 142. If not already secured, the sensor 22 preceding the cable pack 24 to be wound may be secured at the sensor clip 96. The winding is performed to wind most of the cable pack 24 around the mandrel 34, while still leaving some cable remaining, to allow positioning of the subsequent sensor 22 and the cable end. In step 208 the subsequent sensor 22 (FIG. 1) is folded over, and secured to the sensor clip 96. At about the same time (just before or just after) the cable end near the subsequent sensor is secured to the retainer ring 52 or 54 (FIG. 1), in step 210. The wound cable pack 24 may be secured by suitable binding, for example by being wrapped by a strap that is secured to itself with a hook-and-loop material. The process then reverts to step 204, with the indexing tool 64 moved along the mandrel 34 to leave the next winding space 108 free. This process may be repeated until a row is filled up, and then until all the rows are filled up and the sensor line array 20 is fully loaded. The sensor clips 96 may be repositioned as necessary during the process, and removed as each row is fully loaded.

After the sensor array 20 is fully loaded, the system 10 may be disengaged from the rotating chuck, and the indexing tool 64 and the winding fixture 62 may be removed from the loaded system 10. Finally the cannister 21 (FIG. 1) may be placed over the loaded array, and secured.

In deployment the system 10 is released, allowing it to fall downward through water. This process is facilitated by the negatively buoyant nature of the system 10. The sensor line array 20 is then deployed in the reverse order that the sensors 22 and the cable packs 24 were packed. The sensor packed last will deploy first. The terminal weight 32 acts as anchor in biasing one end of the sensor line array 20 downward, and keeping the various sensors 22 separated, and the cable packs 24 from getting tangled with one another.

The system 10 provides the advantage of loading the sensor line array 20 into a small space. In addition, the loading process may be carried out more efficiently, using the packing system 140, allowing for in situ loading of the system 10. Finally, the winding method aids in avoiding tangling of the cable packs 24 with one another during winding and deployment.

Although aspects have been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A packed sensor line array system comprising:
a central mandrel oriented in an axial direction;
a plate beneath the central mandrel;
a plurality of sensors connected by a plurality of cable packs that are between successive sensors of the plurality of sensors, the plurality of sensors and the plurality of cable packs together constituting a sensor line array;
wherein the plurality of cable packs are wound around the central mandrel; and
wherein the plurality of sensors are aligned in the axial direction and are outboard of the plurality of cable packs.

2. The packed sensor line array system of claim 1, wherein the cable packs are stacked and aligned in the axial direction when wound around the central mandrel.

3. The packed sensor line array system of claim 1, further comprising one or more cable retainers for retaining ends of the cable packs that are closest to the sensors.

4. The packed sensor line array system of claim 3, wherein the one or more cable retainers are one or more rings that to which the ends of a cable are coupled.

5. The packed sensor line array system of claim 1, wherein the central mandrel is part of a pedestal that also includes a terminal weight at an end of the central mandrel.

6. The packed sensor line array system of claim 1, wherein the sensors are sonobuoys.

7. The packed sensor line array system of claim 1, in combination with equipment for winding the plurality of cable packs around the central mandrel.

8. The combination of claim 7, wherein the equipment includes an indexing tool.

9. The combination of claim 8, wherein the indexing tool includes an annular disk, and a hollow rod attached to the plate.

10. A packed sensor line array system comprising:
a central mandrel; and
sensors connected by cable packs that are between successive of the sensors, the sensors and the cable packs together constituting a sensor line array;
wherein the cable packs are wound around the central mandrel;
wherein the sensors are outboard of the cable packs;
wherein the packed sensor line array is in combination with equipment for winding the plurality of cable packs around the central mandrel;
wherein the equipment includes an indexing tool;
wherein the indexing tool includes an annular disk, and a hollow rod attached to the plate; and
wherein the hollow rod is configured to fit around the central mandrel, and to be secured to the central mandrel in any of multiple positions.

11. The combination of claim 10,
wherein the hollow rod has multiple holes therein, separated axially along the hollow rod;
wherein the central mandrel has a hole therein; and
wherein the hollow rod is maintained in position relative to the central mandrel, by alignment of one of the multiple holes of the hollow rod with the hole of the central mandrel.

12. The combination of claim 7, wherein the equipment includes a winding fixture.

13. The combination of claim 12,
wherein the winding fixture includes the plate, and a series of adjustable rods coupled to the plate; and
wherein the winding fixture is configured to couple the central mandrel to a rotatable chuck.

14. The combination of claim 7, wherein the equipment includes one or more retainer clips.

15. The combination of claim 14, wherein the retainer clips are configured to secure the sensors around the cable packs during winding.

16. A method of loading a sensor line array of alternating cable packs and sensors for a packed sensor line array system, the method comprising:
iteratively, for each of the cable packs in succession, winding the cable pack around a central mandrel, wherein the central mandrel is oriented in an axial direction, and
placing a sensor next to and outboard of a cable pack, wherein at least the sensor is oriented in the axial direction.

17. The method of claim 16, further comprising, between successive iterations of windings of the cable packs, adjusting an indexing tool to provide a winding space on the central mandrel for winding of a subsequent cable pack.

18. The method of claim 16, further comprising coupling, to one or more retainer rings of the packed sensor line array system, ends of a cable pack adjoining the sensors.

19. The method of claim 16, further comprising coupling, to one or more sensor clips outboard of the cable packs, sensors of sensor line array.

20. The method of claim 16, wherein the winding is accomplished by rotating the packed sensor line array system using a rotating chuck to which the packed sensor line array system is coupled.

* * * * *